(12) United States Patent
Gotou et al.

(10) Patent No.: US 9,394,004 B2
(45) Date of Patent: Jul. 19, 2016

(54) ELECTRIC AUTOMOBILE

(75) Inventors: Yusuke Gotou, Saitama (JP); Atsushi Amano, Utsunomiya (JP); Ryoji Tomokage, Utsunomiya (JP); Tomoyuki Suzuki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 335 days.

(21) Appl. No.: 13/882,954

(22) PCT Filed: Oct. 14, 2011

(86) PCT No.: PCT/JP2011/073613
§ 371 (c)(1),
(2), (4) Date: May 1, 2013

(87) PCT Pub. No.: WO2012/060195
PCT Pub. Date: May 10, 2012

(65) Prior Publication Data
US 2013/0220718 A1     Aug. 29, 2013

(30) Foreign Application Priority Data

Nov. 2, 2010 (JP) .................. 2010-246024

(51) Int. Cl.
*B62D 21/15*     (2006.01)
*B60K 1/00*     (2006.01)
*B60L 3/00*     (2006.01)
(Continued)

(52) U.S. Cl.
CPC ............... *B62D 21/155* (2013.01); *B60K 1/00* (2013.01); *B60L 3/0069* (2013.01); *B60L 11/1803* (2013.01); *B60L 11/1877* (2013.01);
(Continued)

(58) Field of Classification Search
CPC .. B60K 1/00; B60K 2001/001; B60K 17/356; B60K 5/1216; B60K 6/40; B60K 7/0007; B60K 8/00; B60K 6/445; B60L 11/1803; B60L 11/1816; B60L 3/0069; B60L 11/1877; B62D 21/11; B62D 21/155; B62D 21/152; B62D 29/046; B60Y 2400/61; H01R 13/518; H01R 13/562; H01R 13/567; H01R 43/26; Y10S 903/951; Y10S 903/952
USPC .............. 180/65.1, 65.22, 291, 297, 299, 300
See application file for complete search history.

(56) References Cited

U.S. PATENT DOCUMENTS 3,292,969 A * 12/1966 Eggert, Jr. ............ B62D 23/005
                                                    24/30.5 W
3,827,525 A *  8/1974 Felzer .......................... 180/232
(Continued)

FOREIGN PATENT DOCUMENTS

JP    2005-207241 A    8/2005
JP    2006-262673 A    9/2006

*Primary Examiner* — John Walters
(74) *Attorney, Agent, or Firm* — Westerman, Hattori, Daniels & Adrian, LLP

(57) ABSTRACT

An electric automobile includes a motor room separated from the cabin and partitioned at the front of the vehicle body and housing a driving motor and a power control unit that drives/controls the driving motor, a pair of side frames extending in the front-back direction of the vehicle body at both sides of the vehicle body; and a unit support frame that encloses the power control unit on four sides and supports the power control unit. The unit frame is suspended from the pair of side frames and is fastened to the pair of side frames. The power control unit is supported by the unit support frame at at least the sides excluding that in the backwards direction of vehicle body of the four sides of the unit support frame.

6 Claims, 7 Drawing Sheets

(51) Int. Cl.
  *B60L 11/18*  (2006.01)
  *B62D 21/11*  (2006.01)
(52) U.S. Cl.
  CPC ............. *B62D21/11* (2013.01); *B60Y 2400/61* (2013.01); *Y02T 10/7005* (2013.01); *Y02T 10/705* (2013.01)

(56) References Cited

U.S. PATENT DOCUMENTS

| | | | | |
|---|---|---|---|---|
| 4,216,839 | A * | 8/1980 | Gould et al. | 180/65.1 |
| 4,487,287 | A * | 12/1984 | Watanabe | B60K 5/1208 180/297 |
| 5,372,216 | A * | 12/1994 | Tsuji et al. | 180/274 |
| 5,555,950 | A * | 9/1996 | Harada et al. | 180/65.1 |
| 5,680,908 | A * | 10/1997 | Reed | B60K 1/00 180/165 |
| 6,036,529 | A * | 3/2000 | Brown et al. | 439/445 |
| 6,220,380 | B1 * | 4/2001 | Mita et al. | 180/65.1 |
| 6,234,267 | B1 * | 5/2001 | Foster, Sr. | 180/300 |
| 6,712,164 | B2 * | 3/2004 | Chernoff et al. | 180/65.1 |
| 7,144,039 | B2 * | 12/2006 | Kawasaki et al. | 280/784 |
| 7,172,042 | B2 * | 2/2007 | Yamaguchi | B60K 6/48 180/65.1 |
| 7,393,016 | B2 * | 7/2008 | Mitsui | B62D 25/08 180/232 |
| 7,445,076 | B2 * | 11/2008 | Shigematsu | 180/299 |
| 7,506,708 | B2 * | 3/2009 | Iwashita | 180/65.1 |
| 7,588,117 | B2 * | 9/2009 | Fukuda | B60K 1/00 180/291 |
| 7,874,395 | B2 * | 1/2011 | Taji et al. | 180/300 |
| 8,474,555 | B2 * | 7/2013 | Kanno | 180/65.1 |
| 8,517,127 | B2 * | 8/2013 | Kanno | 180/65.1 |
| 8,522,909 | B2 * | 9/2013 | Niina | 180/299 |
| 8,523,600 | B2 * | 9/2013 | Hosokawa et al. | 439/445 |
| 8,770,326 | B2 * | 7/2014 | Matano | 180/65.1 |
| 2006/0211287 | A1 * | 9/2006 | Kikuchi et al. | 439/157 |

* cited by examiner

ELECTRIC AUTOMOBILE

CROSS-REFERENCED TO RELATED APPLICATIONS

This application is a National Stage entry of International Application PCT/JP2011/073613 filed Oct. 14, 2011, which claims priority to Japanese Application No. 2010-246024, filed Nov 2, 2010, the disclosure of these prior applications are hereby incorporated in their entirety by reference.

TECHNICAL FIELD

The present invention relates to an electric automobile that protects high-voltage components from shocks.

BACKGROUND ART

Gasoline automobiles and hybrid automobiles of the background art have an engine, which functions as a rigid body to absorb shocks produced in the event of a collision, for thereby protecting high-voltage components that are disposed behind the engine.

Japanese Laid-Open Patent Publication No. 2005-207241 discloses an inverter, which serves as a high-voltage component, and which is disposed rearwardly in an air cleaner housing that is connected to an intake air passage of an engine on a hybrid automobile. The air cleaner housing and the engine are capable of absorbing shocks to protect the inverter in the event of a collision.

SUMMARY OF INVENTION

However, since electric automobiles do not have an engine, electric automobiles are unable to protect high-voltage components from shocks produced in the event of a collision.

The present invention has been made in view of the foregoing problems of the background art. It is an object of the present invention to provide an electric automobile, which protects high-voltage components from shocks produced in the event of a collision.

To achieve the above object, in accordance with the invention recited in claim 1, there is provided an electric automobile having a motor compartment, which houses therein a traction motor and a power control unit for controlling the traction motor, the motor compartment being defined in a front portion of a vehicle body and isolated from a passenger compartment, comprising a pair of side frames disposed in the motor compartment on both sides of the vehicle body, and extending in a longitudinal direction of the vehicle body, and a unit support frame surrounding the power control unit on four sides thereof for supporting the power control unit, wherein the unit support frame is supported on the side frames and secured to the side frames, and the power control unit is supported by the unit support frame with the four sides thereof, except for at least a rear side of the unit support frame with respect to the vehicle body.

The electric vehicle may further comprise a dashboard panel covering the motor compartment, wherein the unit support frame is fastened to the side frames such that the power control unit is disposed beneath the dashboard panel.

The power control unit may include wire connectors to which electric power supply lines are connected for supplying electric power to the traction motor, and a guard for guarding the wire connectors. The wire connectors and the guard may be disposed on a side of the power control unit, and the guard may be fastened to the unit support frame.

A rotational axis of the traction motor and a rotational axis of a differential gear for transmitting drive power of the traction motor to left and right drive road wheels may be coaxial with each other.

At least a frame, which serves as the rear side of the unit support frame with respect to the vehicle body, out of the four sides thereof, may be of a bent shape, the bent shape being variable as desired.

According to the invention recited in claim 1, the unit support frame, which surrounds the power control unit with four sides thereof and supports the power control unit, supports the power control unit with the four sides, except for at least a rear side of the unit support frame with respect to the vehicle body. Consequently, a space is not required to fasten the rear side of the unit support frame and the power control unit to each other. Thus, due to such a space, the power control unit can be brought rearwardly with respect to the vehicle body, resulting in an increased crushable zone. Therefore, any adverse effects that shocks, which are produced in the event of a collision, have on the power control unit are reduced. Hence, the power control unit, which is a high-voltage component, is protected.

According to the invention recited in claim 2, since the unit support frame is disposed beneath the dashboard panel, the user is prevented from easily accessing the power control unit. Furthermore, when the power control unit is fabricated, the power control unit can be fabricated at a low cost, while reducing concerns in relation to a pedestrian protection area of the vehicle body.

According to the invention recited in claim 3, the power control unit includes the guard for guarding the wire connectors, to which electric power supply lines for supplying electric power to the traction motor are connected. Therefore, the wire connectors, which are high-voltage wire connectors, are protected from shocks produced in the event of a collision.

According to the invention recited in claim 4, since the rotational axis of the differential gear and the rotational axis of the traction motor are coaxial with each other, the traction motor can be installed in a low position, thereby allowing the power control unit to be installed between the dashboard panel and the traction motor without reducing the height of the electric automobile or the height of the power control unit. Therefore, the vehicle body of the electric automobile can be designed with increased freedom, and costs for the power control unit can be reduced.

According to the invention recited in claim 5, since out of the four sides of the unit support frame, the bent shape of the frame at the rear side thereof with respect to the vehicle body can be varied as desired, the power control unit can be placed in as rearward a position as possible with respect to the vehicle body, so as to be out of interference with components in the vicinity of the dashboard panel. In addition, the assembly constituted by the power control unit and the unit support frame is made compact.

DESCRIPTION OF EMBODIMENTS

An electric automobile having a mounting structure for mounting a power control unit on a vehicle body, and a mounting structure of the power control unit according to a preferred embodiment of the present invention will be described in detail below with reference to the accompanying drawings.

Figure 1:
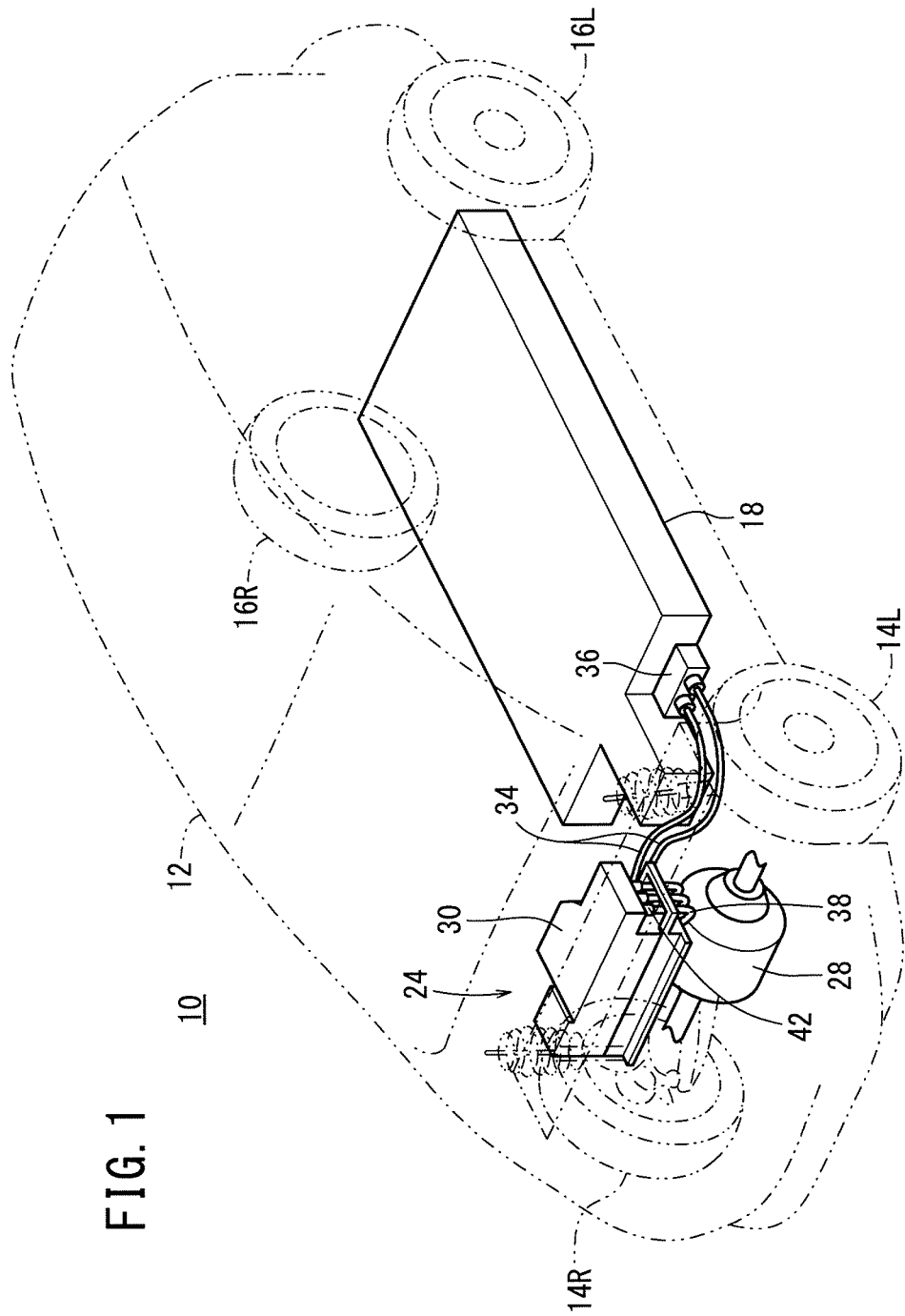
FIG. 1 is a schematic perspective view showing a general arrangement of an electric automobile.
Figure 2:
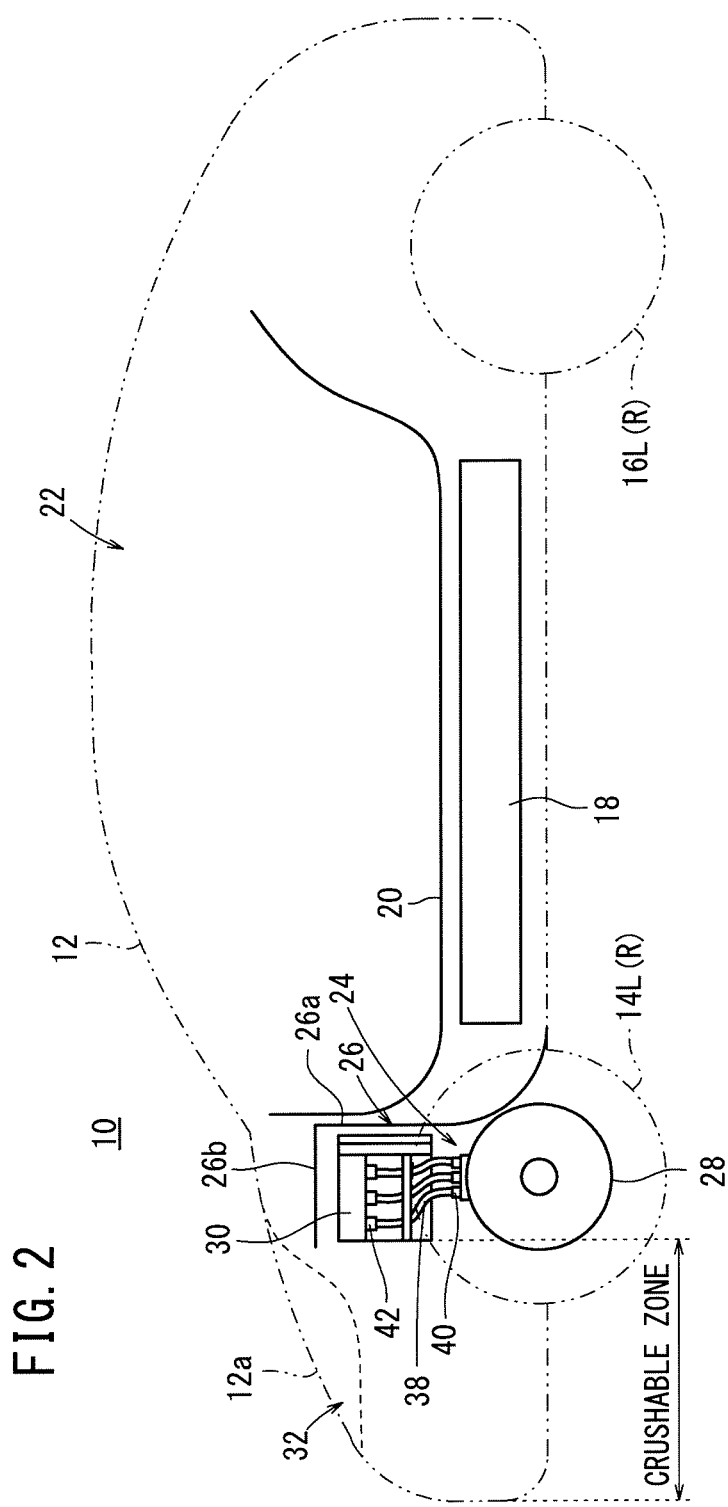
FIG. 2 is a schematic side elevational view showing a general arrangement of the electric automobile.

FIG. 1 is a schematic perspective view showing a general arrangement of an electric automobile 10, and FIG. 2 is a schematic side elevational view showing a general arrangement of the electric automobile 10. In FIGS. 1 and 2, mechanisms and components, which have no bearing on the present invention, are omitted from illustration. In the present embodiment, vertical directions of a vehicle body 12 are referred to as such, and directions perpendicular to the vertical directions are referred to as horizontal directions. The direction in which the electric automobile 10 travels in a forward direction is referred to as a front direction, the direction in which the electric automobile 10 travels in reverse is referred to as a rear direction, the leftward direction as viewed along the direction in which the electric automobile 10 travels forward is referred to as a left direction, and the right direction as viewed along the direction in which the electric automobile 10 travels forward is referred to as a right direction.

The electric automobile 10 contains within the vehicle body 12, between the front road wheels 14L, 14R and the rear road wheels 16L, 16R, a battery 18, which is mounted on the bottom wall of the vehicle body 12 for outputting a high voltage, a passenger compartment 22 defined by a floor panel 20 above the battery 18, a motor compartment 24 defined in a front portion of the vehicle body 12, which is isolated from the passenger compartment 22, a dashboard panel 26 that covers the motor compartment 24, and a power control unit 30 positioned above a motor-driven power device 28 that is disposed in the motor compartment 24. The dashboard panel 26 has a dashboard panel lower member 26a and a dashboard panel upper member 26b. The dashboard panel 26 separates the motor compartment 24 and the passenger compartment 22 from each other, and has a structure for preventing dirt, water, odor, etc., from entering into the passenger compartment 22 from the motor compartment 24. The dashboard panel 26 also has a water draining function, which serves to prevent external water from flowing into A/C (air conditioner) pipes, to be described later.

The power control unit 30 is disposed beneath the dashboard panel 26. Therefore, the dashboard panel upper member 26b must be removed when the power control unit 30 is serviced for maintenance. Accordingly, the user is prevented from easily gaining access to the power control unit 30, which is a high-voltage component.

The vehicle body 12 includes a motor hood 12a that extends above a pedestrian protection area 32 for reducing shocks that may be applied to a pedestrian in the event of a collision. Components such as the power control unit 30 cannot be placed within the pedestrian protection area 32. Therefore, the power control unit 30 must be fabricated in such a way so as not to interfere with the pedestrian protection area 32. According to the present embodiment, since the power control unit 30 is disposed beneath the dashboard panel 26, the power control unit 30 can be fabricated with reduced concern in relation to the pedestrian protection area 32, and hence the power control unit 30 can be fabricated at a reduced cost.

Power supply cables 34 serve to transmit electric power stored in the battery 18 to the power control unit 30. Ends of the power supply cables 34 are connected to a power supply connector 36 of the battery 18, and other ends thereof are connected to a power supply connector of the power control unit 30, to be described later. The power control unit 30 converts DC electric power supplied from the battery 18 into AC electric power in three phases (U, V, W phases), and supplies the three-phase AC electric power to a traction motor of the motor-driven power device 28, to thereby energize the traction motor.

The power control unit 30 has an inverter for converting DC electric power into three-phase AC electric power, and a controller for controlling the inverter (not shown). The traction motor of the motor-driven power device 28 and the power control unit 30 are connected to each other by three-phase AC electric power cables (electric power supply lines) 38. Ends of the three-phase AC electric power cables 38 are connected to electric power connectors (motor-side connectors) 40 of the traction motor, and other ends thereof are connected to electric power connectors (wire connectors) 42 of the power control unit 30. Since the power control unit 30 is disposed above the motor-driven power device 28, the three-phase AC electric power cables 38, which are high-voltage cables, may be reduced in length. The power control unit 30 is mounted in the motor compartment 24 of the vehicle body 12 by a unit support frame and a pair of side frames (mount frames), which will be described below.

Figure 3:
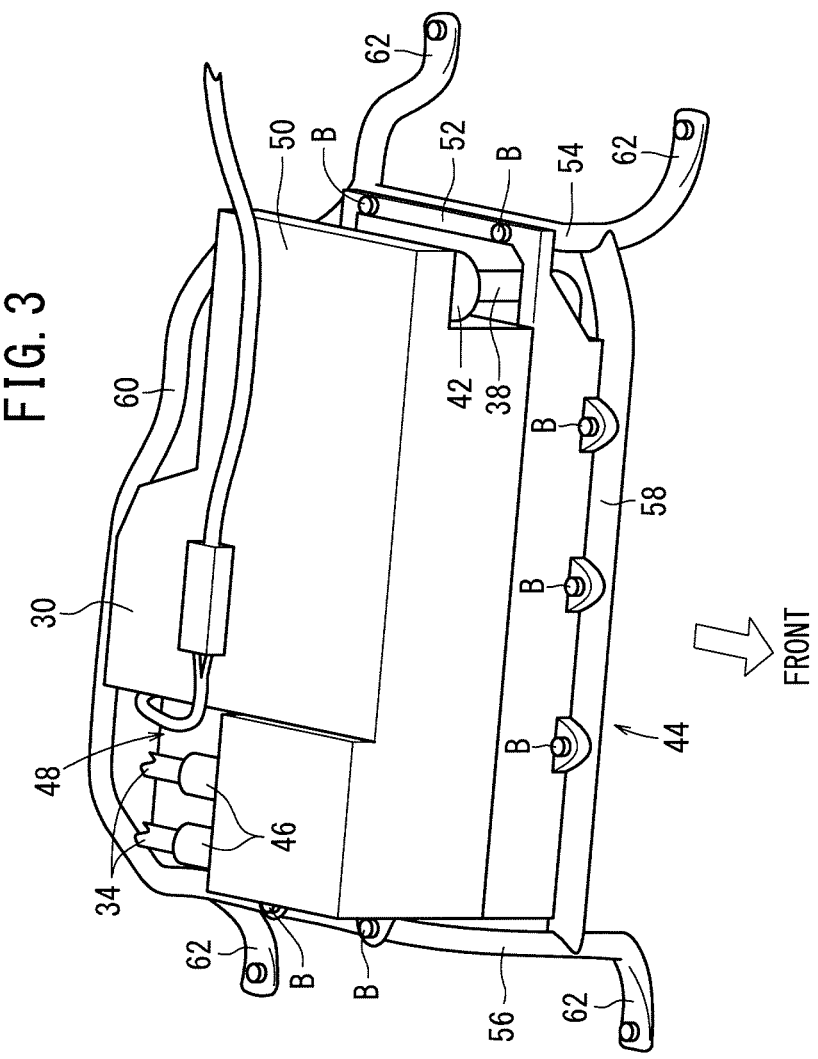
FIG. 3 is a perspective view of a power control unit shown in FIGS. 1 and 2, and a unit support frame supporting the power control unit.
Figure 4:
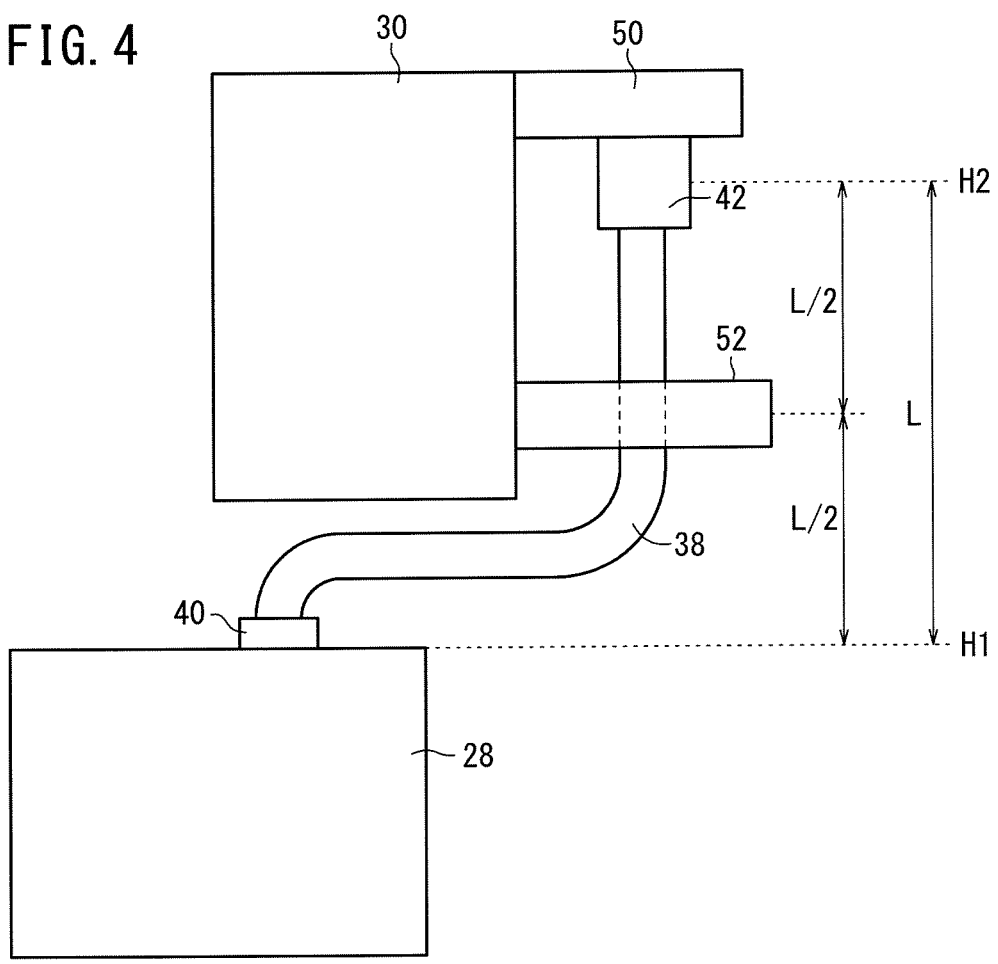
FIG. 4 is a view showing the relationship between the power control unit, a motor-driven power device, and three-phase electric power cables.

FIG. 3 is a perspective view of the power control unit 30 shown in FIGS. 1 and 2, and a unit support frame 44 supporting the power control unit 30. FIG. 4 is a view showing the relationship between the power control unit 30, the motor-driven power device 28, and the three-phase AC electric power cables 38. Power supply connectors 46 are disposed on an upper portion of the power control unit 30, and the electric power connectors 42 are disposed on a side face (left side face) of the power control unit 30. The power supply connectors 46 are mounted on the power control unit 30, and are disposed in a recess 48 defined in the power control unit 30, so that the power supply cables 34, which are connected to the power supply connectors 46, are oriented in a rearward horizontal direction.

The upper portion of the power control unit 30 includes a ledge 50, which projects outwardly from the side face (left side face) thereof in a horizontal direction of the vehicle body 12. The electric power connectors 42 are mounted on a bottom surface of the ledge 50. The electric power connectors 42 are mounted on the power control unit 30 in such a manner that the three-phase AC electric power cables 38, which are connected to the electric power connectors 42, hang downwardly along a vertical direction of the vehicle body 12. Thus, the electric power connectors 42 are prevented from directly suffering shocks produced in the event of a collision.

The power control unit 30 has a guard 52, which surrounds the three-phase AC electric power cables 38 that are connected to the electric power connectors 42, for thereby guarding the three-phase AC electric power cables 38, the ledge 50, and the electric power connectors 42. The guard 52 projects from a side face (left side face) of the power control unit 30 in the horizontal direction of the vehicle body 12, and projects outwardly beyond the ledge 50 (see FIG. 4). The guard 52 has a cavity defined therein through which the three-phase AC electric power cables 38 extend and are connected to the electric power connectors 42 (see FIG. 6). The guard 52 is disposed in an intermediate position between the vertical position of the electric power connectors 40 of the traction motor and the vertical position of the electric power connector 42 of the power control unit 30. The guard 52 is formed integrally with the housing of the power control unit 30.

Since the guard 52 is provided on the housing of the power control unit 30, the electric power connectors 42 can be protected without the need for an increased number of man-hours or components. The guard 52 on the housing of the power control unit 30 surrounds the three-phase AC electric power cables 38, which are connected to the electric power connectors 42, and therefore, the three-phase AC electric power cables 38 are prevented from experiencing forces due to shocks produced in the event of a collision. Therefore, any stresses, which would otherwise be applied to the three-phase AC electric power cables 38 by forces due to shocks produced in the event of a collision, are reduced or eliminated, thereby protecting the electric power connectors 42.

Since the guard 52 projects outwardly beyond the ledge 50, the guard 52 protects the ledge 50 from shocks produced in the event of a collision, thereby effectively protecting the electric power connectors 42, the ledge 50, and the three-phase AC electric power cables 38. Furthermore, since the guard 52 is disposed in an intermediate position between the electric power connectors 40 and the electric power connectors 42, the guard protects the electric power connectors 42, the ledge 50, and the three-phase AC electric power cables 38 more effectively. In order to effectively protect the electric power connectors 42, etc., preferably, the aforementioned intermediate position should be located at about one-half the distance L from a vertical position H1 of the electric power connectors 40 to a vertical position H2 of the electric power connectors 42 (i.e., the distance from the vertical position H1 of the electric power connectors 40 to the vertical position of the guard 52 is represented by L/2) (see FIG. 4).

Inasmuch as the guard 52 is disposed in surrounding relation to the three-phase AC electric power cables 38 that are connected to the electric power connectors 42, rather than in surrounding relation to the electric power connectors 42, the electric power connectors 42 are capable of being viewed, thereby making it easy for the user to connect the three-phase AC electric power cables 38 to the electric power connectors 42.

The unit support frame 44 includes a left side support frame 54, a right side support frame 56 lying substantially parallel to the left side support frame 54, a front support frame 58 extending between the left side support frame 54 and the right side support frame 56, and a rear support frame 60 extending between the left side support frame 54 and the right side support frame 56 at a location behind the front support frame 58. The unit support frame 44 supports the power control unit 30, which is surrounded by the four support frames 54, 56, 58, 60, the four support frames 54, 56, 58, 60 being positioned on the four sides of the unit support frame 44. The front support frame 58, the right side support frame 56, and the left side support frame 54 are fastened by bolts B to the power control unit 30.

More specifically, the front support frame 58 and a front portion of the power control unit 30 are fastened to each other by bolts B, and the right side support frame 56 and a right side face of the power control unit 30 are fastened to each other by bolts B. The guard 52, which is located on the side face (left side face) of the power control unit 30, and the left side support frame 54 are fastened to each other by bolts B. In other words, the power control unit 30 is supported on three sides thereof by the unit support frame 44. Further, since the guard 52 is fastened to the left side support frame 54, the mechanical strength of the guard 52 is increased, thereby increasing the protective capability. Accordingly, the electric power connectors 42, etc., are protected more strongly.

Figure 5:
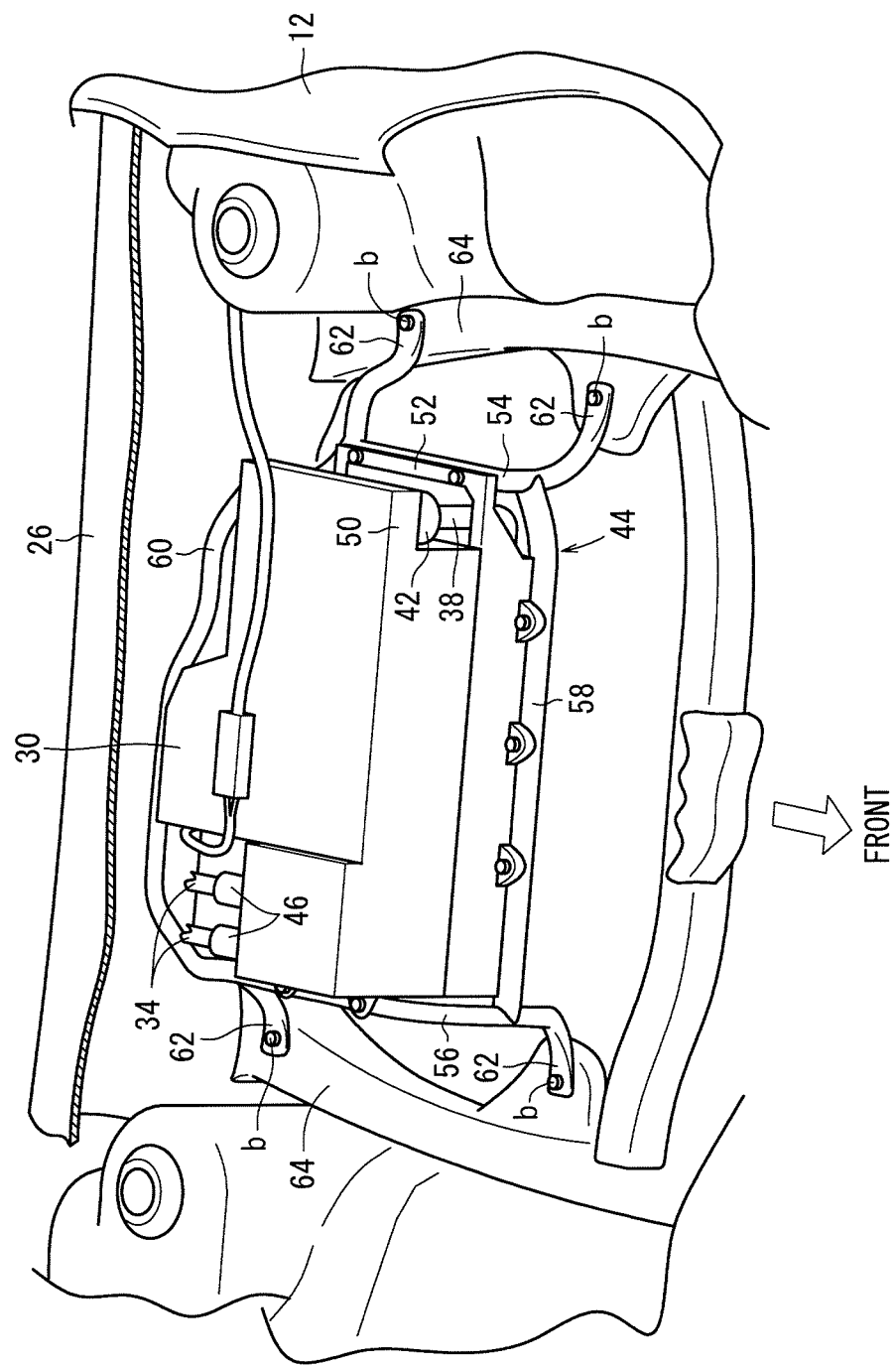
FIG. 5 is a fragmentary perspective view showing a general frontal arrangement of a vehicle body of the electric automobile.

FIG. 5 is a fragmentary perspective view showing in general the front arrangement of the vehicle body 12 of the electric automobile 10. FIG. 5 shows a front portion of the vehicle body 12 with the motor hood 12a being open. In FIG. 5, mechanisms and components, which have no bearing on the present invention and the motor-driven power device 28, are omitted from illustration.

The front portion of the vehicle body 12 includes a pair of side frames 64, 64 disposed on both sides of the vehicle body 12 and extending in the longitudinal direction of the vehicle body 12. The unit support frame 44 is supported on the side frames 64, 64 and is secured thereto by four support legs 62, which are fastened to the side frames 64, 64 by bolts B. In order to minimize adverse effects caused by shocks produced in the event of a collision, the unit support frame 44 is positioned as rearwardly as possible. In other words, the unit support frame 44 is brought as close as possible to the dashboard panel lower member 26a.

Upon securing the power control unit 30 to the unit support frame 44 that is fastened to the side frames 64, 64, if a rear portion of the power control unit 30 and the rear support frame 60 were fastened to each other by bolts B, then a space for tightening the bolts would be required behind the power control unit 30. Therefore, when the unit support frame 44 is fastened to the side frames 64, 64, the unit support frame 44 has to be brought forward by the aforementioned space, resulting in the power control unit 30 being installed in a forward position.

On the other hand, according to the present embodiment, the power control unit 30 is supported by the support frames other than the rear support frame 60, such that the rear support frame 60 and the power control unit 30 are not fastened to each other. Consequently, the power control unit 30 is positioned as rearwardly as possible, thereby reducing adverse effects that shocks produced in the event of a collision exert on the power control unit 30. In other words, since the power control unit 30 is positioned as rearwardly as possible, the vehicle body 12 has an increased crushable zone (see FIG. 2), thereby reducing adverse effects that shocks produced in the event of a collision have on the power control unit 30, and hence protecting the power control unit 30, which is a high-voltage component. Since the crushable zone can be increased, the vehicle body 12 can be designed with increased freedom. Furthermore, inasmuch as the power control unit 30 is brought to as rearward a position as possible, the length of the power supply cables 34, which are high-voltage cables, can be reduced.

Furthermore, since the rear support frame 60 does not support the power control unit 30, even if the power control unit 30 moves rearwardly as a result of shocks that are produced in the event of a collision, any forces that act to block the rearward movement of the power control unit 30 are not produced behind the power control unit 30 until the power control unit 30 actually hits against the rear support frame 60. Therefore, any adverse effects that shocks, which are produced in the event of a collision, have on the power control unit 30 are reduced.

Figure 6:
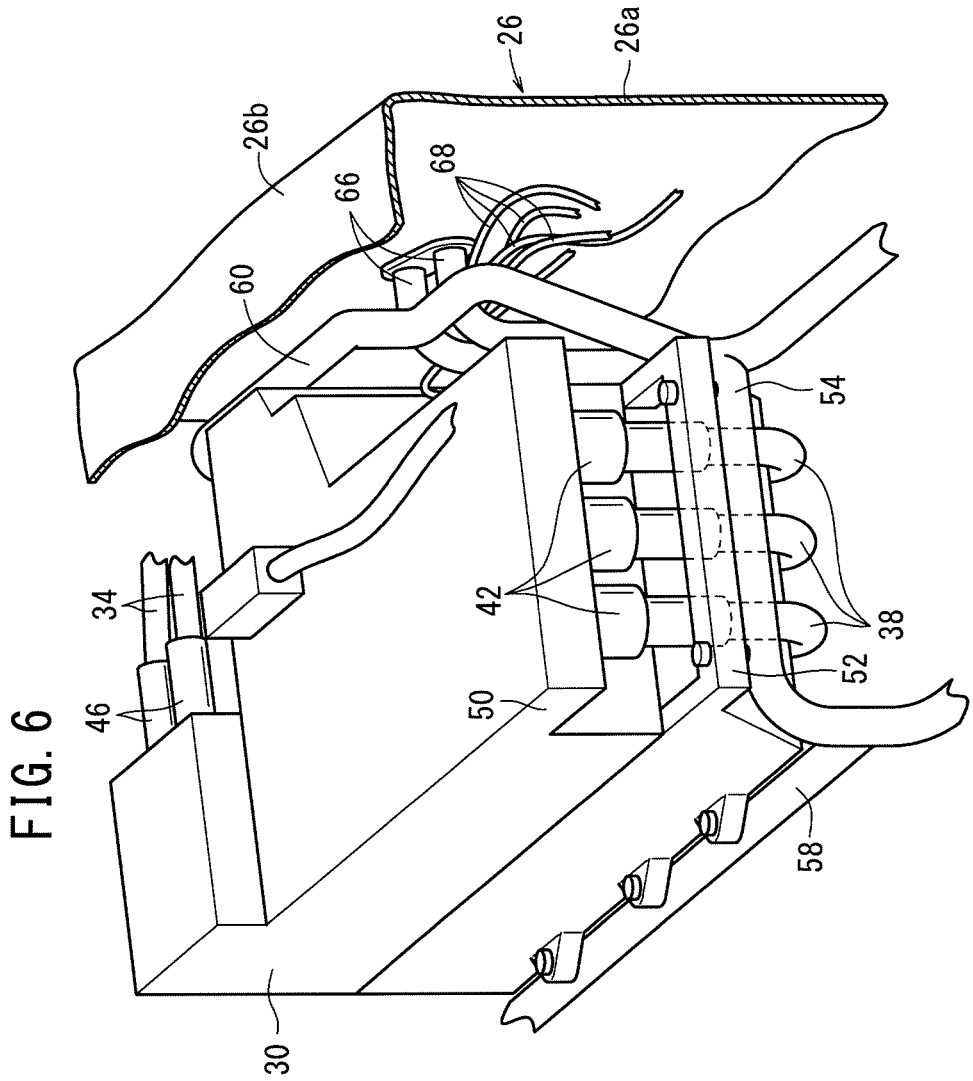
FIG. 6 is a view showing the relationship between a dashboard panel lower member and a rear support frame with the power control unit mounted on a vehicle body.

FIG. 6 is a view showing the relationship between the dashboard panel lower member 26a and the rear support frame 60, with the power control unit 30 being mounted on the vehicle body 12. A/C pipes 66 extend from the motor compartment 24, through the dashboard panel lower member 26a, and into the passenger compartment 22. Other parts such as brake pipes 68 or the like are disposed in the vicinity of the dashboard panel lower member 26a. Therefore, the rear support frame 60 has a bent shape, so as not to interfere with other parts including the A/C pipes 66 and the brake pipes 68, i.e., parts located in the vicinity of the dashboard panel lower member 26a. In other words, the bent shaped of the rear support frame 60 may be varied as desired. The assembly consisting of the power control unit 30 and the unit support frame 44 can be made compact in size, thus allowing the unit support frame 44 to be positioned in a more rearward location, i.e., closer to the dashboard panel 26. Accordingly, any adverse effects that shocks produced in the event of a collision have on the power control unit 30 are reduced, thus enabling the power control unit 30, which is a high-voltage component, to be protected.

Figure 7:
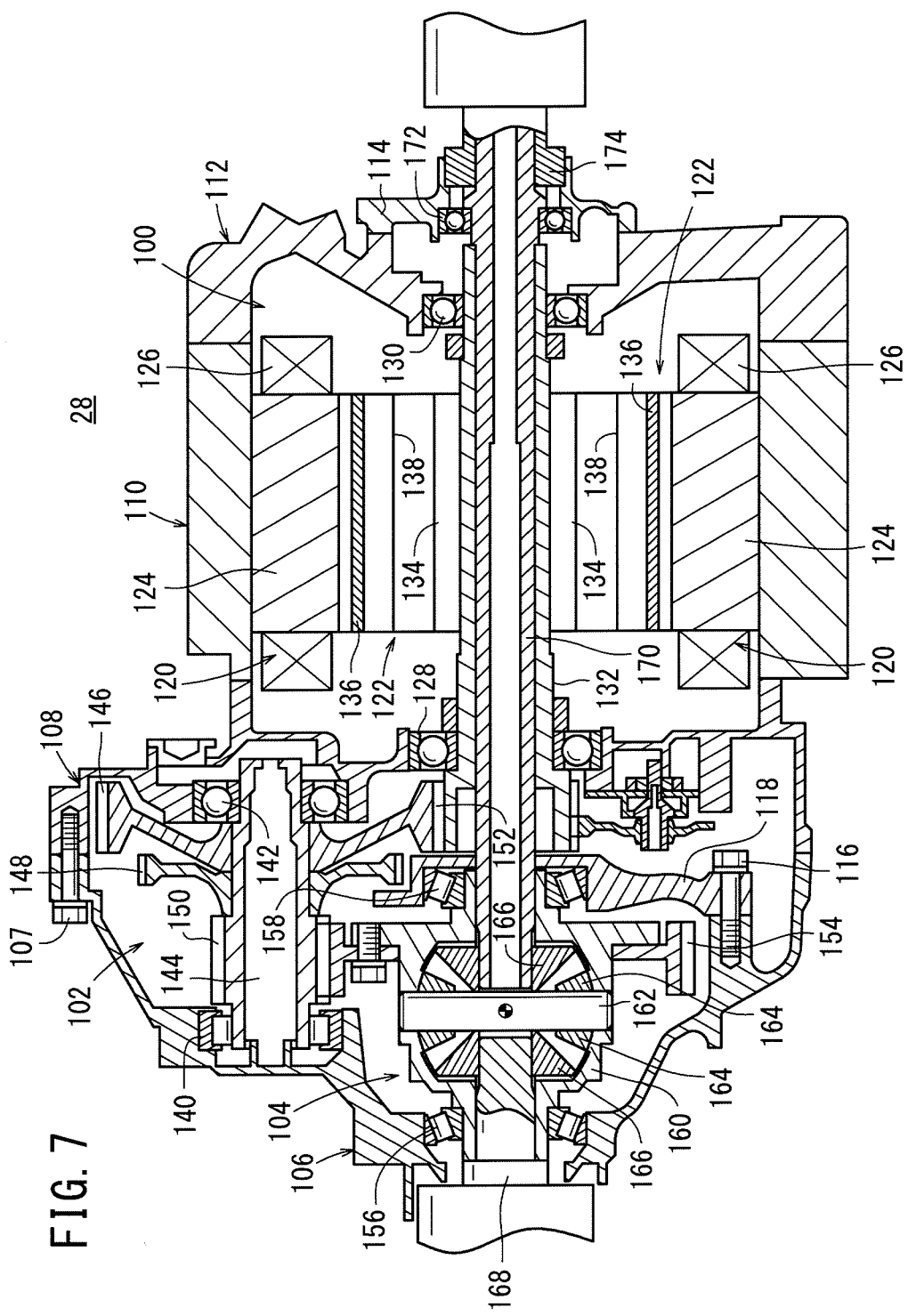
FIG. 7 is a cross-sectional view of the motor-driven power device.

FIG. 7 is a cross-sectional view of the motor-driven power device 28. The motor-driven power device 28 includes a traction motor 100, a speed reducer 102, and a differential gear 104, which are combined in an integral assembly. The motor-driven power device 28 includes an outer housing comprising a transmission case 106 positioned at a left end thereof in the transverse direction of the vehicle body 12, a motor transmission case 108 fastened by bolts 107 to the right end of the transmission case 106, a central motor case 110 fastened by non-illustrated bolts to the right end of the motor transmission case 108, a side motor case 112 fastened by non-illustrated bolts to the right end of the central motor case 110, a central shaft bearing support 114 fastened by non-illustrated bolts to the right end of the side motor case 112, and an intermediate case 118 fastened by bolts 107 to an inner surface of the transmission case 106. The traction motor 100 is accommodated in the motor transmission case 108, the central motor case 110, and the side motor case 112, whereas the speed reducer 102 and the differential gear 104 are accommodated in the transmission case 106 and the motor transmission case 108.

The traction motor 100 includes a stator 120, which is fixed to an inner circumferential surface of the central motor case 110, and a rotor 122 rotatably disposed inside of the stator 120. The stator 120 has a plurality of stator cores 124, each comprising stacked steel plates, disposed in a circumferential array, and a plurality of coils 126 wound respectively around the stator cores 124. The rotor 122 has a hollow rotor shaft 132, which is rotatably supported by respective ball bearings 128, 130 on the motor transmission case 108 and the side motor case 112, a rotor core 134 comprising stacked steel plates fixedly mounted on the rotor shaft 132, and a plurality of permanent magnets 136 embedded in an outer circumferential surface of the rotor core 134. The rotor core 134 has a plurality of through holes 138 that extend axially therethrough.

The speed reducer 102 has a speed reducer shaft 144, which is supported respectively by a roller bearing 140 and a ball bearing 142 on the transmission case 106 and the motor transmission case 108. The speed reducer 102 also has a second speed reducer gear 146, a parking gear 148, and a final drive gear 150, which are mounted on the speed reducer shaft 144. The speed reducer 102 further includes a first speed reducer gear 152 mounted on the left end of the rotor shaft 132, and which is held in mesh with the second speed reducer gear 146 of the speed reducer shaft 144. The final drive gear 150 of the speed reducer shaft 144 is held in mesh with a final driven gear 154 of the differential gear 104.

The differential gear 104 includes a differential case 160, which is supported rotatably on the transmission case 106 and the intermediate case 118, respectively, by tapered roller bearings 156, 158, a pair of differential pinions 164, 164 which are supported rotatably on the differential case 160 by a pinion pin 162, and a pair of differential side gears 166, 166 which are held in mesh simultaneously with both of the differential pinions 164, 164. The final driven gear 154 is fixed to an outer circumferential surface of the differential case 160.

A left drive shaft 168 having a right end thereof splined to the left differential side gear 166 extends through the differential case 160 and the transmission case 106, in a leftward transverse direction of the vehicle body 12. A central shaft (half shaft) 170 having a left end thereof splined to the right differential side gear 166 extends through the differential case 160, the transmission case 106, and the hollow rotor shaft 132, in a rightward transverse direction of the vehicle body 12. A right drive shaft 174 is splined to the central shaft 170, the right end of which is supported on the central shaft bearing support 114 by a ball bearing 172. The front road wheel 14L is connected to the left drive shaft 168, and the front road wheel 14R is connected to the right drive shaft 174.

When the traction motor 100 is energized, torque (rotational power) of the rotor shaft 132 is transmitted through the first speed reducer gear 152 and the second speed reducer gear 146 to the speed reducer shaft 144. From the speed reducer shaft 144, the torque is transmitted through the final drive gear 150 and the final driven gear 154 to the differential case 160. The torque, which is transmitted to the differential case 160, is distributed via the differential pinions 164 and the differential side gears 166 at a given ratio to the left drive shaft 168, the central shaft 170, and the right drive shaft 174, depending on how the electric automobile 10 is being turned. Consequently, when the traction motor 100 is energized, the front road wheels 14L, 14R are rotated.

Since the rotational axis of the traction motor 100 and the rotational axis of the differential gear 104 are coaxial with each other, the motor-driven power device 28 can be installed in a low position, thereby allowing the power control unit 30 to be installed between the dashboard panel 26 and the traction motor 100, without requiring a reduction in the height of the electric automobile 10 or a reduction in the height of the power control unit 30 in the vertical direction of the vehicle body 12. In other words, since the installation position of the motor-driven power device 28 is lowered, the space defined between the dashboard panel upper member 26b of the dashboard panel 26 and the motor-driven power device 28 is increased. Therefore, the vehicle body 12 of the electric automobile 10 can be designed with increased freedom, and the cost of the power control unit 30 can be reduced.

According to the present embodiment, the power control unit 30 is surrounded by the four sides of the unit support frame 44, and is supported by the sides of the unit support frame 44, except for the rear side of the unit support frame 44, with respect to the vehicle body 12. More specifically, the power control unit 30 is supported by the left side support frame 54, the right side support frame 56, and the front support frame 58. Consequently, a space is not required for fastening the power control unit 30 with bolts B to the rear side (the rear support frame 60) of the unit support frame 44, which is fastened to the side frames 64, 64. The power control unit 30 can thus be brought rearwardly with respect to the vehicle body 12 into such a space, resulting in an increased crushable zone. Therefore, any adverse effects that shocks may have on the power control unit 30 in the event of a collision are reduced. Thus, the power control unit 30, which is a high-voltage component, is protected.

Since the unit support frame 44 is disposed beneath the dashboard panel 26, the user is prevented from easily gaining access to the power control unit 30. Furthermore, since the unit support frame 44 is disposed beneath the dashboard panel 26, the power control unit 30 can be fabricated with less concern in relation to the pedestrian protection area 32, and hence, the power control unit 30 can be fabricated at a reduced cost.

The electric power connectors 42, to which the three-phase AC electric power cables 38 are connected in order to supply electric power to the traction motor 100, and the guard 52, which guards the electric power connectors 42, are mounted on the power control unit 30. In addition, the guard 52 is fastened to the unit support frame 44 that supports the power control unit 30 thereon. Consequently, the mechanical strength of the guard 52 is increased for increasing the protective capability thereof. Accordingly, the electric power connectors 42, which are high-voltage connectors, are protected from shocks produced in the event of a collision, and thus are protected in a more robust manner.

The electric power connectors 42 are mounted on the bottom surface of the ledge 50, which projects outwardly from the left side face of the upper portion of the power control unit 30, in a direction perpendicular to the vertical direction of the vehicle body 12. The guard 52, which has a cavity defined therein, projects outwardly from the left side face beyond the ledge 50, in a direction perpendicular to the vertical direction of the vehicle body 12. The three-phase AC electric power cables 38 extend through the cavity and are connected to the electric power connectors 42. Therefore, the three-phase AC electric power cables 38 and the electric power connectors 42 are effectively protected from shocks produced in the event of a collision.

Since the guard 52 is disposed between the electric power connectors 40, by which the three-phase AC electric power cables 38 are connected to the traction motor 100, and the electric power connectors 42, the electric power connectors 42 are protected more effectively.

In the above embodiment, the unit support frame 44 supports the power control unit 30 through the frames, with the exception of the rear support frame 60. However, the unit support frame 44 may not necessarily support the power control unit 30 with at least the rear support frame 60 out of the four sides. In other words, at least the rear support frame 60 out of the four sides and the power control unit 30 may not necessarily be fastened to each other by bolts B. Therefore, the unit support frame 44 may support the power control unit 30 with only the left side support frame 54 and the right side support frame 56, for example. Although the unit support frame 44 and the power control unit 30 are fastened to each other by bolts B in the above embodiment, they may be fastened to each other by other fastening members apart from the bolts B.

In the above embodiment, the power control unit 30 lies horizontally (upper and lower surfaces of the power control unit 30 lie horizontally). However, the power control unit 30 may be oriented obliquely. The guard 52 may be mounted on a side face (left side face) of the power control unit 30, which is mounted on the vehicle body 12 by the unit support frame 44, such that when the electric power connectors 42 and the guard 52 project in a vertical direction of the vehicle body 12, the projected image of the guard 52 surrounds projected images of the electric power connectors 42.

Although a preferred embodiment of the present invention has been described above, the technical scope of the invention is not limited to the range of the above description of the embodiment. It will be obvious to those skilled in the art that various changes and improvements can be made to the above embodiment. Such changes and modifications also fall within the technical scope of the invention, as is apparent from the scope of the invention as set forth in the appended claims.

The invention claimed is:

1. An electric automobile comprising:
a motor compartment, which houses therein a traction motor and a power control unit for controlling the traction motor and supplying electric power to the traction motor, the motor compartment being defined in a front portion of a vehicle body and isolated from a passenger compartment by a dashboard panel, the power control unit including a front side, a rear side, a left side and a right side;
a pair of side frames disposed in the motor compartment on both sides of the vehicle body, and extending in a longitudinal direction of the vehicle body; and
a unit support frame supported on the side frames, secured to the side frames, and bridging between the pair of side frames, the unit support frame surrounding the power control unit for supporting the power control unit,
wherein the unit support frame includes a front support frame disposed at the front of the power control unit, a rear support frame disposed at the rear of the power control unit, a left support frame disposed on the left of the power control unit and a right support frame disposed on the right of the power control unit, the rear support frame being disposed in front of the dashboard panel; and
wherein one of the front side, the left side and the right side of the power control unit is directly connected to the unit support frame, and the rear side of the power control unit is not directly connected to the unit support frame.

2. The electric automobile according to claim 1, wherein the dashboard panel covers the motor compartment;
wherein the unit support frame is fastened to the side frames such that the power control unit is disposed beneath the dashboard panel.

3. The electric automobile according to claim 1, wherein the power control unit includes wire connectors to which electric power supply lines are connected for supplying electric power to the traction motor, and a guard for guarding the wire connectors;
the wire connectors and the guard are disposed on one of the left and the right of the power control unit; and
the guard is fastened to the unit support frame.

4. The electric automobile according to claim 1, wherein a rotational axis of the traction motor and a rotational axis of a differential gear for transmitting drive power of the traction motor to left and right drive road wheels are coaxial with each other.

5. The electric automobile according to claim 1, wherein at least the rear support frame is of a bent shape, the bent shape being variable as desired.

6. The electric automobile according to claim 1, wherein the one of the front side, the left side and the right side of the power control unit is directly connected to corresponding one of the front support frame, the left support frame and the right support frame.

\* \* \* \* \*